Aug. 4, 1970  K. LIEDTKE  3,522,854
METHOD OF AND APPARATUS FOR WEIGHING FIBER
MATERIAL, PARTICULARLY SMOKING TOBACCO
Filed Dec. 18, 1968  5 Sheets-Sheet 2

Fig. 2

Inventor:
KURT LIEDTKE
By
Lowry, Rinehart & Markva
ATTYS.

Inventor:
KURT LIEDTKE

Inventor:
KURT LIEDTKE

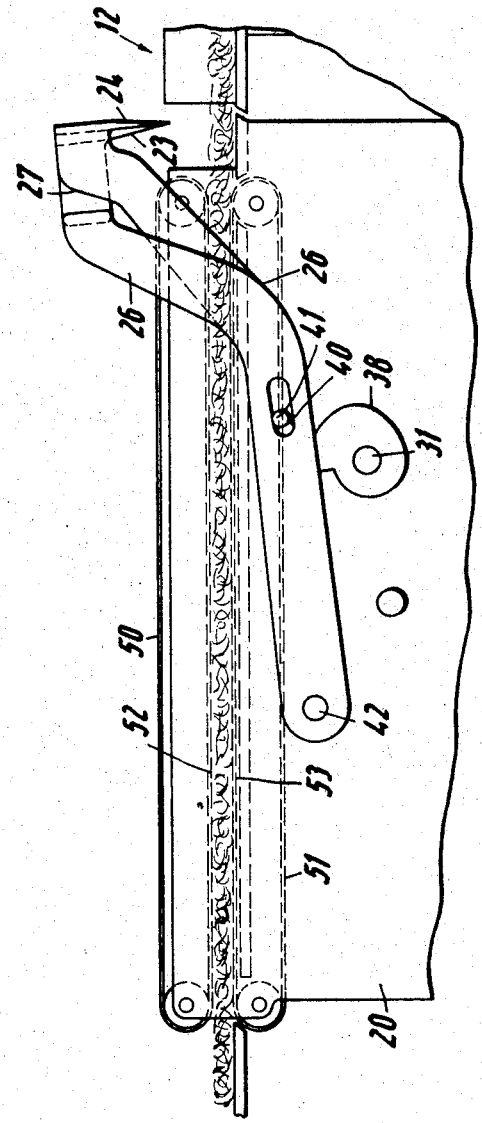

United States Patent Office 3,522,854
Patented Aug. 4, 1970

3,522,854
METHOD OF AND APPARATUS FOR WEIGHING FIBER MATERIAL, PARTICULARLY SMOKING TOBACCO
Kurt Liedtke, Verden (Aller), Germany, assignor to Focke & Pfuhl, Bremen, Germany, a firm
Filed Dec. 18, 1968, Ser. No. 784,862
Int. Cl. G01g 13/02
U.S. Cl. 177—119         11 Claims

ABSTRACT OF THE DISCLOSURE

This invention provides a method of and an apparatus for weighing specified portions of a continuous fleece of fiber material, particularly a continuous fleece of shredded tobacco, on a weighing machine. The method comprises the steps of feeding the leading end of a continuous cohering fleece of fiber material onto a weighing machine and severing this end from the rest of the fleece when the specified weight has been deposited on the weighing machine. The apparatus for carrying out said method comprises conveyor means provided with sidewalls for conveying a continuous fleece of fiber material, a weighing machine having a weighing platform extending on the level of and adjacent the delivery end of the conveyor means and likewise provided with sidewalls aligning with the sidewalls of the conveyor means, and severing means interposed between the conveyor means and the weighing machine and arranged to rip or tear off the weighed leading end from the fleece.

BACKGROUND OF THE INVENTION

This invention relates to a method of and an apparatus for weighing specified portions of a continuous fleece of fiber material, particularly a continuous fleece of shredded tobacco, on a weighing machine.

Shredded smoking tobacco leaves the shredding machine in the form of a continuous cohering fleece in which the individual tobacco fibers are considerably interwoven and intermeshed. The cohesion of the individual fibers greatly impedes the weighing of specified, say of 2-ounce portions of such a material. It was hiteherto the practice to loosen up and tear open the fleece of tobacco with the aid of pin rollers to permit small specified portions to be separated and deposited individually on a weighing machine. However, this loosening and tearing process to which the tobacco fibers were thus submitted gave rise to the formation of a good deal of short fiber tobacco, known as broken tobacco. This was usually added by hand to the individual weighed portions, firstly because the broken tobacco cannot be wasted, and secondly for the purpose of exactly adjusting the weight of each portion. However, from the point of view of the consumer the presence of broken tobacco is undesirable.

SUMMARY OF THE INVENTION

It is therefore the object of the present invention to simplify the weighing of such a fiber material, particularly of shredded tobacco, and at the same time to improve the accuracy of the weighings.

Another object of the invention is to reduce the quantity of broken tobacco that forms during this process.

For achieving these objects, the present invention proposes a method of weighing specified portions of a continuous fleece of fiber material, particularly a continuous fleece of shredded tobacco, on a weighing machine, which comprises the steps of feeding the leading end of a continuous cohering fleece of fiber material onto a weighing machine and severing this end from the rest of the fleece when the specified weight has been deposited on the weighing machine.

The principal feature of this method therefore resides in abandoning the established practice of dividing individual portions from the fleece of tobacco and placing these portions on the weighing machine in favor of feeding the leading end of the continuous cohering fleece directly onto the weighing machine and not cutting off this end from the rest of the fleece until the specified quantity has been deposited on the weighing machine.

The invention further proposes to sever the weighed quantity from the rest of the fleece by tearing it off. This method of severance is preferable to cutting because the cutting tools used for such a purpose tend to become dirty in a very short period of time, and also because cutting creates too much broken tobacco.

The invention also concerns the provision of an apparatus for performing the above-described method. According to the invention the proposed apparatus comprises conveyor means provided with sidewalls for conveying a continuous fleece of fiber material, a weighing machine having a weighing platform extending on the level of and adjacent the delivery end of the conveyor means and likewise provided with sidewalls aligning with the sidewalls of the conveyor means, and severing means interposed between the conveyor means and the weighing machine and arranged to rip or tear off the weighed leading end from the fleece.

According to another feature of the proposed apparatus, the conveyor means may comprise a conveying surface substantially oscillatable in the direction of feed of the fleece and a stationary bridge member between the end of the conveying surface and the weighing platform of the weighing machine.

In an alternative embodiment the conveyor means may consist of belts, preferably of two conveyor belts, the one disposed above the other, in such a manner that cooperating lengths of both belts travelling in feeding direction are suitably spaced gently to compress the material of the fiber fleece between them.

The surface on which the fiber material from say a shredding machine is conveyed therefore comprises a portion which feeds the fleece, for instance by oscillating in the direction of feed or by conveying the fleece between two feeder belts, and a stationary portion on which the fleece is severed by tearing. Adjoining this latter portion is the vertically deflectable weighing platform of the weighing machine.

Another important feature of the invention concerns the construction of the ripping tools which are of comb-like configuration and preferably directly precede the weighing platform, said tools being adapted to be raised and lowered above the bridge member besides being relatively movable by separating in the direction of the conveying surface.

Yet other features of the invention relate to the construction of the drive means for the ripping tools and the construction of the weighing platform. The invention comprises within its scope forms of construction which include such features severally or in combination.

BRIEF DESCRIPTION OF THE DRAWINGS

Several embodiments of the invention will now be hereinafter described by way of example and with reference to the accompanying schematic drawings in which:

FIG. 2 is a view similar to FIG. 1, but showing a detail, namely the ripping tools, in a different position;

FIG. 6 is an embodiment comprising conveyor means in the form of a twin-belt feeder.

DESCRIPTION OF THE PREFERRED EMBODIMENTS

Figure 1:
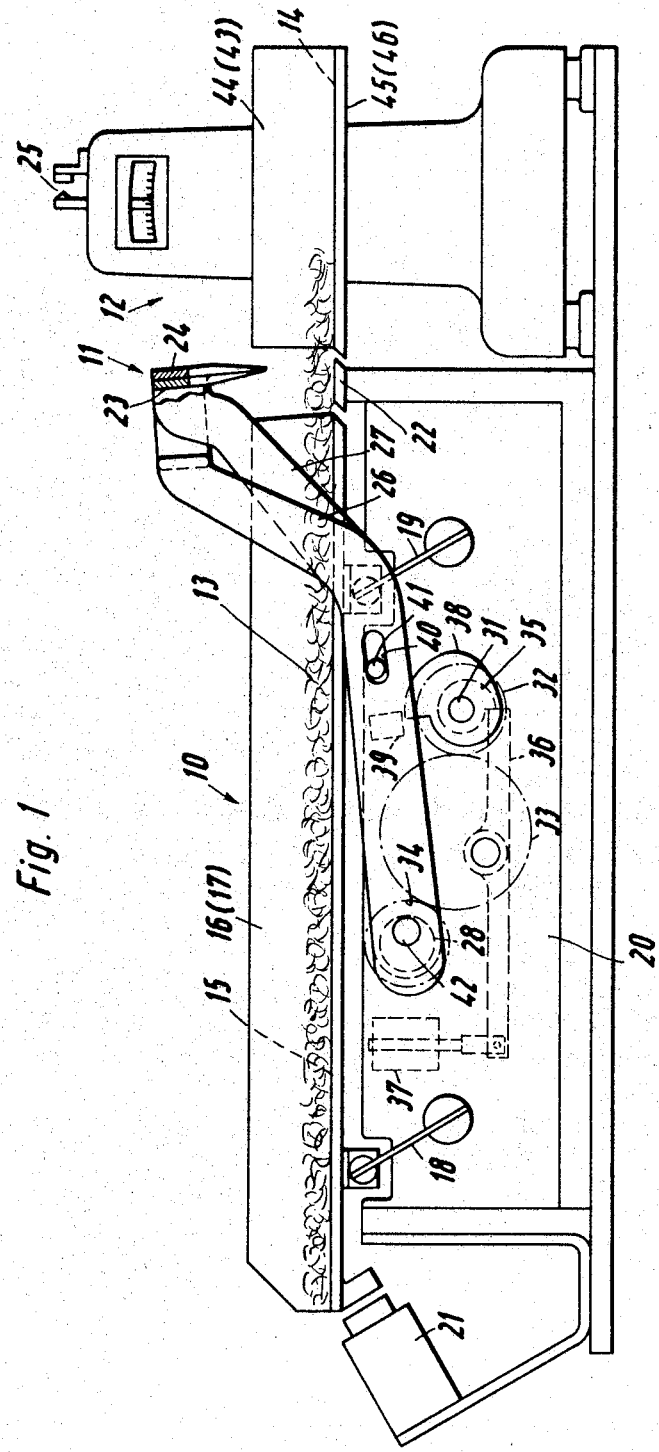
FIG. 1 is a side elevational view of an embodiment of the apparatus according to the invention.

The apparatus for performing the proposed method consists of conveyor means 10 upon which a continuous fleece of fiber material 13 is continuously conveyed to severing means 11 for dividing off weighed portions of tobacco material therefrom, and of a weighing machine 12. The fiber material 13 which arrives in the form of a cohering continuous fleece, such as a shredded smoking tobacco from a shredding machine, is delivered by the conveyor means 10 through the severing means 11 to the weighing platform 14 of the weighing machine 12. According to the invention the cohesion of the fleece is maintained until the weighing machine 12 indicates that a portion of the desired weight has been deposited on its platform 14. At this instant the severing means 11 are activated by a control signal generated by the weighing machine 12, and the weighed portion is separated from the rest of the continuous fleece.

The conveyor means may be of different forms of construction. In the embodiment illustrated in FIGS. 1 to 3 it has the form of a conveying surface 15 which is oscillated in feeding direction, and which is provided with sidewalls 16 and 17 (FIG. 3) for retaining the fleece of fiber material. The conveying surface 15 is supported from an underframe 20 on four oscillating springs 18 and 19 of which two are arranged on each side of the conveying surface. The oscillations of the conveying surface 15 are generated by an electromagnet 21.

Interposed between the end of the conveying surface 15 and the weighing machine 12 is a stationary rigidly fixed bridge member 22 which prevents mutual interference between the motions of the conveying surface 15 and the weighing platform 14 of the weighing machine 12. On this bridge member 22 which is separated from the conveying surface 15 as well as from the weighing platform 14 by a narrow gap, the weighed portion of material is separated by ripping tools 23 and 24, the bridge member 22 simultaneously forming a base for the action of these ripping tools. Whilst the material is being fed onto the weighing machine 12, i.e., before the prescribed quantity of material has been conveyed onto the weighing platform 14, the ripping tools 23 and 24 are kept raised above the bridge member 22 (FIG. 1), and the severing means are not activated until the prescribed quantity of material lies on the weighing platform 14, when a signal is generated by the closing of a contact 25 on the weighing machine 12. The two ripping tools 23 and 24 in close contiguous adjacency are then lowered onto the bridge member 22 and penetrate the material in which they then move apart, performing an expanding movement which causes the material to be separated by a tearing action (FIG. 2).

Figure 3:
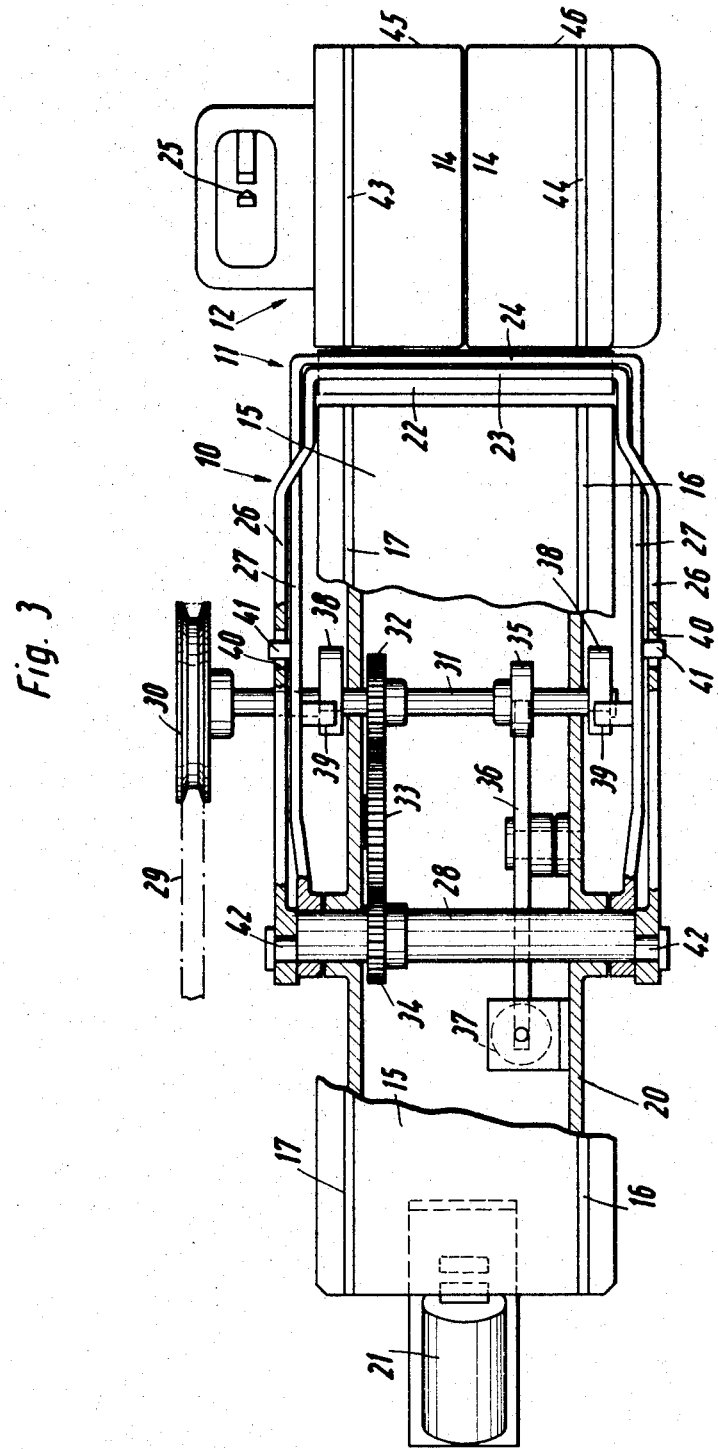
FIG. 3 is a top plan view of the apparatus.
Figure 4:
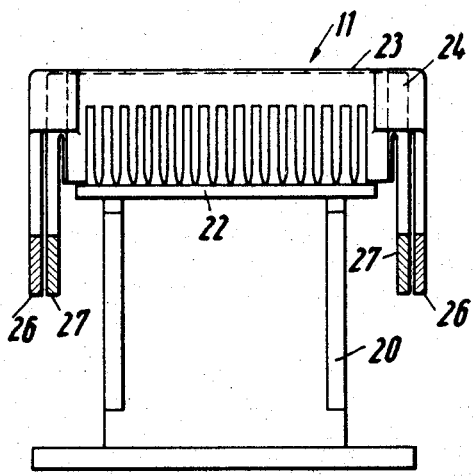
FIG. 4 is an embodiment of ripping tools according to the invention.

The drive means for generating these motions of the ripping tools 23 and 24 are illustrated in FIGS. 1 to 3. The two ripping tools which preferably have the general configuration of combs (FIG. 4) are attached to hoop-shaped carrier arms 26 and 27 mounted on a shaft 28. This shaft 28 is driven by a friction drive comprising a belt 29 and a pulley 30 (FIG. 3). This friction drive may be replaced by a slip coupling. The drive is first transmitted to a shaft 31 which in turn transmits it through gear wheels 32, 33 and 34 to the shaft 28. Whilst the fiber material continues to be deposited on the weighing platform 14, the shaft 31 and hence the shaft 28 remain stationary. They are kept stationary by locking means comprising an arresting disc 35 mounted on the shaft 31, a deflectable lever 36 and a solenoid 37 for actuating the deflectable lever 36. The end of the lever 36 is adapted to abut a step on the arresting disc 35 (FIG. 1).

The shaft 31 also carries a cam disc 38 which cooperates with a projecting follower member 39 on the carrier arm 27. The up and down motion of the ripping tools 23 and 24 is generated by this cam disc 38 in cooperation with the follower member 39, the required motion being transmitted to both carrier arms 26 and 27 by virtue of said two carrier arms being coupled together by a slot and pin motion 40, 41.

For generating the relative motion between the two ripping tools 23 and 24 when these have been lowered, the ends of one carrier arm 26 are linked to a crankpin 42 on the shaft 28. When the shaft 28 rotates, the carrier arm 26 and hence the ripping tool 23 perform a reciprocating motion at the level of the fleece of fiber material 13.

The described apparatus for performing the method proposed by the invention functions as follows:

As soon as the conveying surface 15 has delivered the requisite quantity of material to the weighing platform 14, the contact 25 closes and causes the solenoid 37 to be energized. Consequently, the deflectable lever 36 will be pulled out of engagement with the arresting disc 35 and the friction drive comprising the belt 29 and the pulley 30 can operate, imparting rotation to the shaft 31. First the cam disc 38 is rotated from its position shown in FIG. 1 into its position shown in FIG. 2, causing the follower member 39 and hence the ripping tools 23 and 24 to be lowered. In the course of further rotation which is transmitted through the gear wheels 32, 33 and 34 to the shaft 28 one of the ripping tools is displaced in the lengthwise direction of the material, whereas the other ripping tool remains stationary. Consequently, the material on the bridge member 22 is divided by the resultant tearing action of the ripping tools. This displacement of one of the ripping tools is effected by the crankpin 42. As soon as the shaft 28 has performed a full rotation, the two ripping tools 23 and 24 will have returned into contiguous adjacence. During rotation of the shaft 31 the follower member 39 rides on the cam disc 38 until the position shown in FIG. 1 is re-established, in which the ripping tools are again raised above the bridge member 22 as shown in FIG. 1. The material 13 therefore now continues to be fed onto the weighing platform 14. The movements of the cam disc 38 on the one hand and of the gear wheels 32, 33 and 34 on the other hand may proceed for different periods of time in such a manner that the ripping tools are lifted at the instant the tools are most widely separated, i.e., when the fiber material has been divided, or not until the ripping tools are again contiguous, as illustrated in FIG. 2.

Figure 5:
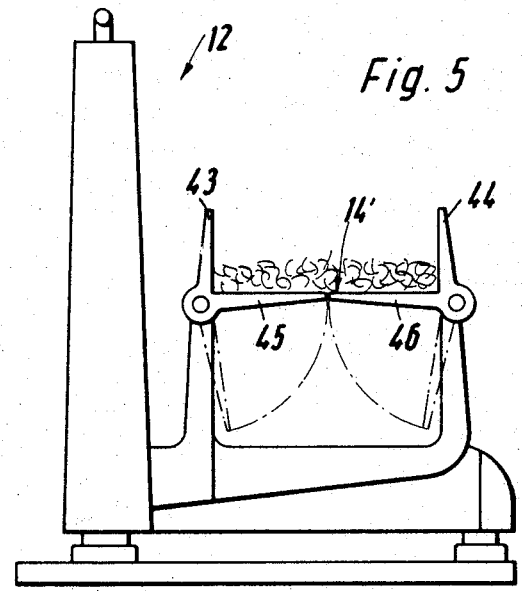
FIG. 5 is a weighing machine according to the invention.

An embodiment of a weighing machine as proposed by the invention is illustratively shown in FIG. 5. With reference to this drawing the weighing platform 14' is formed with retaining sidewalls 43 and 44 which are spaced to align with the corresponding sidewalls 16 and 17 of the conveying surface. The weighing platform 14' itself may be formed by two flaps 45 and 46 which are likewise operable in dependence upon the result of the weighing, the flaps dropping as shown in dot and dash lines when the correctly weighed quantity has been divided from the rest of the fleece and depositing the weighed quantity for instance on a conveyor belt for further processing or delivery to say a packaging machine.

In an alternative embodiment of the weighing platform the latter may be of trough-shaped construction, comprising a flat surface facing the bridge across which the fiber fleece is advanced whilst weighing proceeds. Above the trough-shaped weighing platform is a clearing tool which is likewise operable in synchronism with the dividing process on the bridge member and which sweeps across the weighing platform and clears the weighed quantity of material, for instance onto a conveyor belt. The clearing tool may be so suspended that it will not touch the weighing platform during the weighing process.

FIG. 6 is a further embodiment of the invention in which the conveyor means consists of two conveyor bands or belts 50 and 51 disposed the one above the other, both being driven in feeding direction. The two belts extend close up to the bridge member 22. Preferably, the spacing of the cooperating runs 52 and 53 of the two conveyor belts 50 and 51 is so chosen that the material between these two runs will be gently compressed. For improving the desired effect the surfaces of the belts or bands may be roughened or profiled to give better grip.

The embodiments that have been described with reference to the accompanying drawings may be modified in diverse ways.

For instance, the motion of the ripping tools may be generated by solenoids instead of by mechanical transmission means. Furthermore, the ripping tools may be mounted for relative movement in the transverse as well as in the longitudinal direction of the conveyor means.

What is claimed is:

1. An apparatus for weighing specified portions of a continuous fleece of fiber material, comprising
   (a) conveyor means provided with sidewalls for conveying a continuous fleece of fiber material,
   (b) a weighing machine having a weighing platform extending on the level of and adjacent the delivery end of the conveyor means and likewise provided with sidewalls aligning with the sidewalls of the conveyor means, and
   (c) severing means interposed between the conveyor means and the weighing machine and arranged to rip or tear off the weighed leading end from the fleece.

2. An apparatus according to claim 1, wherein the conveyor means comprises a conveying surface substantially oscillatable in the direction of feed of the fleece and a stationary bridge member between the end of the conveying surface and the weighing platform of the weighing machine.

3. An apparatus according to claim 2, comprising ripping tools preceding the weighing platform and preferably located above the bridge member, said ripping tools being vertically reciprocable and relatively movable first to penetrate the fleece of fiber material and then to divide the weighed leading end from the following part of the fleece by the tools separating in the lengthwise direction of the fleece.

4. An apparatus according to claim 3, comprising ripping tools in the form of two jointly and relatively movable combs.

5. An apparatus according to claim 3, wherein at least one of the ripping tools is monted on carrier arms preferably located on each side of the conveyor means and operated by a crank drive activated by a signal from the weighing machine when the specified quantity has been fed onto the weighing platform.

6. An apparatus according to claim 5, wherein the crank for driving at least one of the ripping tools is at the end of a shaft upon which the carrier arms of the other ripping tool are also mounted.

7. An apparatus according to claim 6, comprising a friction drive for driving the shaft and the crank, and locking means preferably operable by a solenoid and releasable by a signal from the weighing machine, for keeping the friction drive stationary until the weighed portion of material equals the specified weight.

8. An apparatus according to claim 7, wherein the carrier arms of the ripping tools rest on a cam discs which begins to rotate after release of a locking means and thereby allows the ripping tools to descend.

9. An apparatus according to claim 8, wherein the weighing platform is formed by two downwardly deflectable hinged flaps which are controlled by the weighing machine.

10. An apparatus according to claim 8, wherein the weighing platform is trough-shaped and level with the side of the bridge, and a hinged clearing tool is adapted to sweep through the trough at synchronously controlled periodical intervals.

11. An apparatus according to claim 1, comprising conveyor means in the form of belts, preferably of two conveyor belts, the one above the other, travelling in feeding direction and suitably spaced gently to compress the material between them.

References Cited

UNITED STATES PATENTS

| 2,380,733 | 7/1945 | Durning | 177—119 XR |
| 2,822,024 | 2/1958 | Himmelheber et al. | 177—121 XR |

FOREIGN PATENTS

| 334,107 | 8/1930 | Great Britain. |
| 654,056 | 6/1951 | Great Britain. |

ROBERT S. WARD, JR., Primary Examiner

U.S. Cl. X.R.

177—116, 60